United States Patent [19]

Ogawa et al.

[11] Patent Number: 4,680,225

[45] Date of Patent: Jul. 14, 1987

[54] MAGNETIC TAPE HAVING A LEADER TAPE

[75] Inventors: Hiroshi Ogawa; Chiaki Mizuno; Yasuo Tamai; Koozi Kamiyama, all of Odawara, Japan

[73] Assignee: Fuji Photo Film Co., Ltd., Kanagawa, Japan

[21] Appl. No.: 750,358

[22] Filed: Jul. 1, 1985

[30] Foreign Application Priority Data

Jun. 29, 1984 [JP] Japan ................................ 59-133010

[51] Int. Cl.$^4$ ............................................. G11B 5/627
[52] U.S. Cl. ..................................... 428/323; 252/506; 428/336; 428/480; 428/500; 428/694; 428/900
[58] Field of Search ............... 428/323, 694, 900, 480, 428/500, 336; 252/502, 506

[56] References Cited

U.S. PATENT DOCUMENTS

| | | | |
|---|---|---|---|
| 4,047,232 | 9/1977 | Hisagen | 360/134 |
| 4,135,032 | 1/1979 | Akashi et al. | 428/900 |
| 4,164,604 | 8/1979 | Tamai et al. | 428/694 |
| 4,275,108 | 6/1981 | Yamaguchi et al. | 428/329 |
| 4,310,599 | 1/1982 | Akashi et al. | 428/694 |
| 4,397,911 | 8/1983 | Akashi et al. | 428/483 |
| 4,476,177 | 10/1984 | Mizuno et al. | 428/694 |

*Primary Examiner*—Paul J. Thibodeau
*Attorney, Agent, or Firm*—Armstrong, Nikaido, Marmelstein & Kubovcik

[57] ABSTRACT

A magnetic tape having a leader tape excellent in cleaning effect as well as antistatic effect and free from head clogging is provided comprising a coating layer provided on one or both sides of a support, at at least one end of the magnetic tape, in which the coating layer contains, as predominant components, an electrically conductive powder and a binder and the leader tape has a percent photo-transmission of at least 20%.

18 Claims, No Drawings

MAGNETIC TAPE HAVING A LEADER TAPE

BACKGROUND OF THE INVENTION

1. Field of the Invention

This invention relates to a magnetic tape having a leader tape at the end thereof and more particularly, it is concerned with a leader tape having a specified percent photo-transmission.

2. Description of the Prior Art

In magnetic recording instruments such as audio cassette recorders or video tape recorders, leader tapes are used in combination with the ends of magnetic tpes so as to clean dirt or dust off the recording and reproducing heads in use and the guide poles or rollers in the running paths and to detect the tape ends.

In the leader tapes of the prior art, it is known to provide a cleaning layer on a support by coating an inorganic pigment such as alumina ($Al_2O_3$), silicon carbide (SiC), chromium oxide ($Cr_2O_3$), titanium oxide ($TiO_2$), red oxide ($\alpha$-$Fe_2O_3$) or silicon oxide ($SiO_2$) with a binder (Japanese Patent Publication No. 7631/1980). This leader tape has a cleaning effect, but meets often with the problems that due to its static charging property, discharge noise tends to occur and dirt or dust is adsorbed to cause drop out. Thus, another approach consists in adding antistatic agents to the cleaning layer or coating antistatic agents onto the cleaning layer. In the case of adding an antistatic agent to the cleaning layer, however, it must be used in a large amount, so the strength of the cleaning layer is lowered and the cleaning layer tends to be stripped off. When adding black conductive grains such as carbon black and metallic fine powders, the cleaning layer has little photo-transmission and the leader tape cannot play a role to detect the tape end. In the case of coating an antistatic agent onto the cleaning layer, moreover, there arise the problems that head clogging tends to occur due to adhesion of the antistatic agent and the antistatic effect is lowered when using for a long period of time.

Furthermore, as one of the prior art, there has been proposed a method comprising using a mixture of inorganic and organic powders (Japanese Patent Application OPI (Kokai) No. 12411/1982). However, this method has also the drawback that resulting cleaning leader tape causes increase of drop out due to its electrification property and when it is subjected to an antistatic treatment, head clogging tends to occur.

That is, according to the prior art, it is impossible to solve sufficiently the problems in magnetic tapes having cleaning leader tapes, i.e. increase of drop out due to static charge, lowering of the strength of the cleaning tape by the antistatic treatment, decrease of the photo-transmission, head clogging and lowering of the antistatic effect after use for a long period of time.

SUMMARY OF THE INVENTION

It is an object of the present invention to provide a magnetic tape having a leader tape with an excellent cleaning effect.

It is another object of the present invention to provide a magnetic tape having a leader tape having a stable and excellent antistatic effect for a long period of time or having little electrification property and being free from increase of drop out.

It is further object of the present invention to provide a magnetic tape having a leader tape without head clogging.

It is a still further object of the present invention to provide a magnetic tape having a leader tape whose cleaning effect is not deteriorated even after storage at a high temperature.

It is a still further object of the present invention to provide a leader tape for a magnetic tape, whereby the above described disadvantages of the prior art can be overcome.

These objects can be attained by a magnetic tape having a leader tape comprising a coating layer provided on one or both sides of a support, at at least one end of the tape, characterized in that the coating layer contains, as predominant components, an electrically conductive powder and a binder and the leader tape has a percent photo-transmission of at least 20%.

DETAILED DESCRIPTION OF THE INVENTION

The inventors have made various efforts to solve the above described problems and consequently, have reached the magnetic tape having a leader tape according to the present invention.

Accordingly, the present invention provides a magnetic tape having, at at least one end thereof, a leader tape comprising a coating layer provided on one or both sides of a support, characterized in that the coating layer contains predominantly an electrically conductive powder and a binder and the leader tape has a percent photo-transmission of 20% or more. Furthermore, the present invention has another feature that the coating layer, i.e. cleaning layer further contains a white inorganic powder and/or white resion powder in addition to the conductive powder and binder.

The electrically conductive powder used in the present invention is preferably a powder having generally a mean grain size of 1 to 0.001 $\mu$m, preferably 0.7 to 0.005 $\mu$m, a volume resistance of $10^0$ to $10^8$ $\Omega$-cm and in a granular, global, ellipsoidal, cubic, needle-like or plate-like form. Examples of the electroconductive powder are (1) $SnO_2$, $In_2O_3$, ZnO, $BaTiO_3$ and $SrTiO_3$ each having conductivity and grey, blue, violet or yellow color; (2) the above described electroconductive powders (1) doped with elements with different valences to raise the conductivity, such as $SnO_2$ doped with 2-20 atom % of $Sb^{5+}$, $In_2O_3$ doped with 2-20 atom % of $Sn^{4+}$, $BaTiO_3$, $SrTiO_3$ and (Ba, Sr)$TiO_3$, doped with 0.1-1 atom % of $La^{3+}$, $Y^{3+}$, $Ce^{3+}$ $Nd^{3+}$, $Sb^{3+}$ and $Bi^{3+}$; (3) electroconductive powders, such as ZnO, $BaTiO_3$ and $SrTiO_3$, into which oxygen defects are introduced by a heat treatment in a non-oxygen atmosphere, such as $ZnO_{1-x'}$ $BaTiO_{3-x}$ and $SrTiO_{3-x}$ wherein x=0.01-0.3, preferably 0.02-0.2, as disclosed in Japanese Patent Application OPI (Kokai) No. 156603/1981; and (4) ordinary white pigments or extenders, such as $Al_2O_3$, $TiO_2$, $SiO_2$, $Sb_2O_3$, $BaSO_4$ and ZnO, in a fine powder having a mean grain size of 0.05 to 2 $\mu$m, preferably 0.01 to 1 $\mu$m, which are coated with the above described electroconductive powders (1) to (3) to form an electroconductive layer, preferably coated with an electroconductive layer consisting of $SnO_2$ or $In_2O_3$ doped with an element of different valence, as disclosed in Japanese Patent Application OPI (Kokai) No. 11825/1982.

The above described electrically conductive powder used in the present invention is characterized by a higher conductivity as well as a higher percent phototransmission when it is dispersed in a binder and coated, as compared with the commonly used carbon, metallic fine powders and black iron oxide ($Fe_3O_4$). This characteristic is particularly remarkable when using $SnO_2$ or $In_2O_3$, optionally doped with different elements.

The electrically conductive powder in the coating layer of the present invention may further contain a white inorganic powder and/or a white resin powder.

In one embodiment of the present invention, wherein the coating layer contains predominantly an electrically conductive powder, white inorganic powder and binder, the durability of the cleaning effect can further be increased in addition to the effects in the embodiment using an electrically conductive powder and binder. In the case of a coating layer, i.e. cleaning layer of the prior art, using predominantly a white pigment, drop out is increased due to the static charging property and when subjected to an antistatic treatment, head clogging or other troubles take place. When the coating layer of the present invention contains predominantly an electrically conductive powder free from electrification property and a white inorganic powder, not only the electrification property is lowered to such an extent that an antistatic treatment is not necessary as in the first embodiment of the present invention, but also the durability of the cleaning effect is surprisingly increased more than in the case of only an electrically conductive powder.

Examples of the white inorganic powder used in the present invention are alumina ($\alpha$-$Al_2O_3$), titanium oxide ($TiO_2$), zinc sulfide (ZnS), lithopone ($ZnS$-$BaSO_4$), barium sulfate ($BsSO_4$), zinc oxide (ZnO), aluminum silicate ($Al_4(SiO_4)_3 \cdot 5H_2O$), silicon oxide ($SiO_2$) and the like. Generally, the white inorganic powder has a grain size of 0.01 to 5 μm, preferably 0.1 to 3 μm. These white inorganic powders can preferably be used, individually or in combination, in a proportion of 0 to 950 parts preferably 10 to 500 parts by weight to 100 parts by weight of the electrically conductive powder.

In another embodiment of the present invention, wherein the cleaning layer contains predominantly an electrically conductive powder, white resin powder and binder, there can be obtained an additional merit that a head is not scratched in addition to the effects of the first embodiment of the present invention. In the case of a cleaning layer of the prior art, containing predominantly a white pigment and resin powder, drop out is increased due to the static charging property and when subjected to an antistatic treatment, head clogging takes place, but there is obtained a merit that a head is not scratched. According to this embodiment of the present invention, the cleaning layer contains predominantly a white electrically conductive powder free from electrification property, white resin powder and binder, thus resulting in advantages that drop out is not increased, head clogging does not take place because of not needing an antistatic treatment and a head is not scratched because of containing the white resin powder.

Examples of the white resin powder used in the present invention are acetylcellulose, polyethylene, polypropylene, polyester resins, polyamide resins, polyacrylonitrile resins, polyacetal resins, phenol resins, urea resins, triazine resins, melamine resins, epoxy resins and the like. In particular, polyethylene, urea resins and triazine resins are preferably used.

Generally, these resin powders have a grain size of 0.1 to 10 μm, preferably 0.3 to 3 μm. If the grain size is less than 0.1 μm, the cleaning effect is little, while if more than 10 μm, the tape tends to break in a high incidence when the leader tape is cramped by a hub. These white resin powders can preferably be used, individually or in combination, in a proportion of 0 to 450 preferably 10 to 450 parts by weight of 100 parts by weight of the electrically conductive powder.

In a further embodiment of the present invention, the coating layer on the leader tape may contain predominantly an electrically conductive powder, white inorganic powder, white resin powder and binder. In this case, there can be obtained a magnetic tape having a leader tape with excellent properties that the electrification property is less, drop out is not increased, head clogging does not occur, the cleaning effect is durable even after storage at 110° C. and any head is free from scratching.

Preferably, the white resin powder and white inorganic powder are jointly used in a total quantity of 0 to 450, preferably 10 to 450 parts by weight per 100 parts by weight of the electrically conductive powder.

As the binder of the present invention, there are used known resins such as vinyl chloride/vinyl acetate copolymers, vinylidene chloride type copolymers, nitrocellulose, polyester resins, polyurethane resins, polyisocyanates and the like. These binders can be used, individually or in combination, in a proportion of 10 to 600 parts by weight, preferably 15 to 400 parts by weight to 100 parts by weight of the powder. The percent phototransmission can be varied by varying the proportion of the powder and binder.

The powder and binder are mixed and dispersed in an organic solvent. As the organic solvent, there can be used any of organic materials which are not reactive with the powders and are capable of dissolving the binders and which have a boiling point of 60° to 200° C., for example, ketones such as methyl ethyl ketone, methyl isobutyl ketone, cyclohexanone and the like and acetic acid esters such as ethyl acetate, butyl acetate and the like. In addition, toluene or xylene can be used as a diluent.

The thus obtained mixed composition is coated onto, partially or wholly, one or both sides of a support with a coating thickness of 0.05 to 20 μm, preferably 0.1 to 10 μm.

The support used in the present invention is a non-magnetic flexible support having a haze of preferbly 80% or less, more preferably 10 to 80%. If the haze is less than 10%, the leader tape meets with a marked change of the appearance (clarification) and a marked decrease of the cleaning effect, while if more than 80%, the percent phototransmission of the leader tape is decreased so that it is difficult to detect the end of the magnetic tape by means of a photoelectric senser, and the strength of the leader tape is lacking.

As the support, there are preferably used films of polyethylene terephthalate, polypropylene, polycarbonates, polyethylene naphthalate, polyamides and polyimides. The haze can be controlled by adding a white inorganic powder to the support or precipitating a catalyst for the polymerization as internal grains, as occasion demands.

Examples of the support are disclosed in Japanese Patent Publication No. 23888/1968, Japanese Patent Application OPI (Kokai) Nos. 122178/1976 and 116066/1976 (incorporated by reference).

The smaller is the heat shrinkage of the support, the better. After storage at 110° C. for 4 hours, for example, the heat shrinkage is 3% or less, preferably 1% or less. Generally, the support has a thickness of 3 to 50 μm, preferably 6 to 25 82 m.

Furthermore, dispersing agents can be used for the purpose of improving the dispersibility of the powders in the binders. Optionally, lubricants can jointly be used. Any of the commonly used dispersing agents and lubricants are available, as disclosed in Japanese Patent Application OPI (Kokai) No. 108804/1977.

On the other hand, the leader tape of the present invention should be controlled so as to have a percent photo-transmission of 20% or more, since if the percent photo-transmission is less than 20%, it is difficult to detect the end of the magnetic tape by means of a photo-electric senser.

If necessary, the leader tape of the present invention can be printed with letters or marks, as exemplified in Utility Model Application OPI (Kokai) Nos. 2209/1976 and 72924/1978.

The following examples are given in order to illustrate the present invention without limiting the same. It will be obvious to one skilled in the art that various changes and modifications can be made in the components, ratios, operational order and the like without departing from the spirit of the present invention. All parts in Examples are to be taken as those by weight.

Electrically conductive powders used in Examples and Comparative Examples are as follows:

a: Sb-doped $SnO_2$ powder (mean grain size 0.4 μm, Sb content 6 atom %)

b: $TiO_2$ powder coated with Sb-doped $SnO_2$ (Sb 0.5 atom %, Sn 7 atom %, specific surface area 6 m²/g, mean grain size 0.4 μm)

c: $\alpha$-$Al_2O_3$ powder coated with Sb-doped $SnO_2$ (Sb 0.5 atom %, Sn 7 atom %, specific surface area 6 m²/g, mean grain size 0.4 μm)

d: Sb-doped $SnO_2$ powder (Sb 10 atom %, mean grain size 0.2 μm)

e: Sn-doped $In_2O_3$ powder (Sn 10 atom %, mean grain size 0.2 μm)

EXAMPLE 1-1

Using the above described Electrically Conductive Powders a–e, coating compositions for leader tapes were prepared according to the following recipe:

| | |
|---|---|
| Electrically Conductive Powder | 100 parts |
| Nitrocellulose (RS ½ second) | 25 parts |
| Polyester Polyurethane | 10 parts |
| Polyisocyanate (commercial name: Desmodur L, solid content of 75% solution) | 10 parts |
| Methyl Ethyl Ketone | 500 parts |

The above described composition was well blended to form a coating composition for a leader tape and coated onto a support of polyethylene terephthalate with a thickness of 20 μm to give a coating thickness of 8 μm on dry basis, followed by drying. This tape was slit in a width of 3.8 mm to obtain a leader tape for a compact cassette.

This leader tape was cramped with a hub to examine the cramp force and the state of breakage of the tape at that time, and loaded in a 1 m cassette half, which was then subjected to running in a cassette recorder having a magnetic head previously made dirty, to examine the number of times required for removing the dirt. Thus, the less the number of times required for removing the dirt, the larger the cleaning effect. At the same time, head clogging was examined after running 10,000 times.

On the other hand, the cleaning effect was examined after running. The leader tape before and after running was rubbed with a cotton bloth to examine the electrification property by a distance at which a cigarette ash was attracted when the rubbed leader tape was put over the cigarette ash. The longer the attraction distance, the stronger the static charging property.

The thus obtained results are shown in Table 1 by Sample Nos. 1–5.

COMPARATIVE EXAMPLE 1-1

The procedure of Example 1-1 was repeated except using the following white powders instead of Electrically Conductive Powders to obtain leader tapes:

f: $TiO_2$ (mean grain size 0.5 μm)
g: $\alpha$-$Al_2O_3$ (mean grain size 0.5 μm)
h: Triazine Resin Powder (mean grain size 2.5 μm; true specific gravity 1.4)

The propeties of the resulting leader tapes are shown in Table 1 as Sample Nos. 6–8.

COMPARATIVE EXAMPLE 1-2

Antistatic agent of quaternary ammonium salt type (commercial name: EFUKOORU 72 manufactured by Matsumoto Yushi KK) was coated onto the surfaces of the leader tapes of Comparative Example 1-1 in a proportion of 200 mg/m².

TABLE 1

| Sample No. | Powder | Percent Phototransmission (%) | Breakage Ratio at Cramping (%) | Cramp Force (g) | Cleaning Effect (times) | Electrification Property (cm) | After Running 10,000 Times Head Clogging | After Running 10,000 Times Missing of Coating Layer | After Running 10,000 Times Cleaning Effect (times) | After Running 10,000 Times Electrification Property (cm) |
|---|---|---|---|---|---|---|---|---|---|---|
| Example 1-1 | | | | | | | | | | |
| 1 | a | 77 | 0 | 1800 or more | 1 | 0.0 | | | 2 | 0 |
| 2 | b | 79 | 0 | 1800 or more | 1 | 0 | " | " | 2 | 0 |
| 3 | c | 80 | 0 | 1800 or more | 1 | 0 | " | " | 2 | 0 |
| 4 | d | 81 | 0 | 1800 or more | 1 | 0 | " | " | 2 | 0 |
| 5 | e | 81 | 0 | 1800 or more | 1 | 0 | " | " | 2 | 0 |
| Comparison 1-1 | | | | | | | | | | |
| 6 | f | 78 | 0 | 1800 or more | 1 | 10 | " | " | 2 | 10 |

TABLE 1-continued

| Sample No. | Powder | Percent Phototrans-mission (%) | Breakage Ratio at Cramping (%) | Cramp Force (g) | Cleaning Effect (times) | Electri-fication Property (cm) | After Running 10,000 Times ||||
|---|---|---|---|---|---|---|---|---|---|---|
| | | | | | | | Head Clogging | Missing of Coating Layer | Cleaning Effect (times) | Electri-fication Property (cm) |
| 7 | g | 79 | 0 | 1800 or more | 1 | 9 | " | " | 2 | 10 |
| 8 | h | 83 | 0 | 1800 or more | 2 | 12 | " | " | 4 | 12 |
| Comparison 1-2 | | | | | | | | | | |
| 9 | f | 78 | 0 | 1800 or more | 1 | 0.5 | somewhat | " | 2 | 5.0 |
| 10 | g | 79 | 0 | 1800 or more | 1 | 0.5 | somewhat | " | 2 | 6.0 |
| 11 | h | 83 | 0 | 1800 or more | 2 | 0.5 | somewhat | " | 4 | 5.5 |

EXAMPLE 1-2

Using Electrically Conductive Powder a, the procedure of Example 1-1 was repeated except changing the total weight parts of Nitrocellulose, Polyester Polyurethane and Polyisocyanate and the weight part of the solvent without changing the relative proportion of Nitrocellulose, Polyester Polyurethane and Polyisocyanate (50:30:20), thus obtaining leader tapes. The total weight parts and the properties of the resulting leader tapes are shown in Table 2 as Sample Nos. 12-20.

TABLE 2

| Sample No. | Total Amount of Binder (parts) | Percent Phototrans-mission (%) | Breakage Ratio Cramping (%) | Cramp Force (g) | Cleaning Effect (times) | Electri-fication Property (cm) | After Running 10,000 Times ||||
|---|---|---|---|---|---|---|---|---|---|---|
| | | | | | | | Head Clogging | Missing of Coating Layer | Cleaning Effect (times) | Electri-fication Property (cm) |
| Example 1-2 | | | | | | | | | | |
| 12 | 25 | 76 | 0.0 | 1600 | 1 | 0 | no | no | 1 | 0 |
| 13 | 10 | 70 | 0 | 1500 | 1 | 0 | " | yes | 1 | 0 |
| 14 | 15 | 75 | 0 | 1550 | 1 | 0 | " | somewhat | 1 | 0 |
| 15 | 50 | 77 | 0 | 1800 or more | " | 0 | " | no | 2 | 0 |
| 16 | 100 | 78 | 0 | 1800 or more | " | 0 | " | " | " | 0 |
| 17 | 200 | 78 | 0 | 1800 or more | " | 0 | " | " | " | 0 |
| 18 | 400 | 79 | 0 | 1800 or more | " | 0 | " | " | " | 0 |
| 19 | 600 | 80 | 0 | 1800 or more | 2 | 0.5 | " | " | 3 | 0.5 |
| 20 | 800 | 82 | 0 | 1800 or more | 3 | 0.5 | " | " | 5 | 0.5 |

It will clearly be understood from Table 1 that the leader tapes of the present invention (Sample Nos. 1 to 5) have less electrification property and more excellent cleaning effect than that of the prior art (Sample Nos. 6 to 8). The leader tapes subjected to the antistatic treatment of the prior art (Sample Nos. 9 to 11) meet with head clogging and deterioration of the antistatic effect. Thus, the leader tapes of the present invention are more excellent in cleaning effect as well as antistatic effect and do not or hardly meet with head clogging and deterioration of the cleaning effect and antistatic effect.

Furthermore, it is apparent from Table 2 that the amount of the binder in the coating layer of the leader tape is preferably about 15 to 400 parts per 100 parts of Electrically Conductive Powder, according to the present invention.

EXAMPLE 1-3

The leader tapes of Example 1-1 were slit in a width of ½ inch to obtain leader tapes for video tapes. The resulting leader tapes were combined with hubs in the order of 17 cm of Leader Tape, 247 m of Video Tape and 17 cm of Leader Tape. The resulting VHS video cassette tape was subjected to running in a VHS video deck 200 times for assessment of the performances.

The results are shown as Sample Nos. 21 to 25 in Table 3.

COMPARATIVE EXAMPLE 1-3

The leader tapes of Comparative Example 1-1 were slit in a width of ½ inch to obtain leader tapes for video tapes and then subjected to assessment in an analogous manner to Example 1-3. The results are shown as Sample Nos. 26 to 28 in Table 3.

COMPARATIVE EXAMPLE 1-4

The leader tapes of Comparative Example 1-2 were slit in a width of ½ inch to obtain leader tapes for video tapes and then subjected to assessment in an analogous manner to Example 1-3. The results are shown as Sample Nos. 29-31 in Table 3.

TABLE 3

| Sample No. | White Powder | Head Clogging | Increase of Drop out |
|---|---|---|---|
| Example 1-3 | | | |
| 21 | a | no | no |
| 22 | b | " | " |
| 23 | c | " | " |
| 24 | d | " | " |

TABLE 3-continued

| Sample No. | White Powder | Head Clogging | Increase of Drop out |
|---|---|---|---|
| 25 | e | " | " |
| Comparison 1-3 | | | |
| 26 | f | " | yes |
| 27 | g | " | " |
| 28 | h | " | " |
| Comparison 1-4 | | | |
| 29 | f | yes | somewhat |
| 30 | g | " | " |
| 31 | h | " | " | cessed in an analogous manner to Example 1-1, to obtain leader tapes for compact cassettes.

The resulting leader tapes were subjected to assessment in an analogous manner to Example 1-1, thus obtaining results as shown in Table 4 as Sample Nos. 32 to 39.

It is apparent from Table 4 that the leader tapes using the electroconductive powders and white inorganic powders according to the present invention are more excellent in cleaning effect as well as antistatic effect and these effects are not changed even after running 10,000 times.

TABLE 4

| Sample No. | White Electrically Conductive Powder | White Inorganic Powder | Percent Phototrans- mission (%) | Cramp Force (g) | Cleaning Effect (times) | Electri- fication Property (cm) | After Running 10,000 Times |||| 
|---|---|---|---|---|---|---|---|---|---|---|
| | | | | | | | Head Clogging | Missing of Coating Layer | Cleaning Effect (times) | Electri- fication Property (cm) |
| Example 2-1 | | | | | | | | | | |
| 32 | a | i | 76 | 1800 or more | 1 | 0 | no | no | 1 | 0 |
| 33 | b | i | 73 | 1800 or more | 1 | 0 | " | " | 1 | 0 |
| 34 | c | i | 74 | 1800 or more | 1 | 0 | " | " | 1 | 0 |
| 35 | d | i | 78 | 1800 or more | 1 | 0 | " | " | 1 | 0 |
| 36 | e | i | 78 | 1800 or more | 1 | 0 | " | " | 1 | 0 |
| 37 | a | j | 77 | 1800 or more | 1 | 0 | " | " | 1 | 0 |
| 38 | a | k | 80 | 1800 or more | 1 | 0 | " | " | 1 | 0 |
| 39 | a | l | 77 | 1800 or more | 1 | 0 | " | " | 1 | 0 |

Examples of the white inorganic powder used in the following Examples and Comparative Examples are as follows:

i: $\alpha$-$Al_2O_3$ (mean grain size 0.3 $\mu$m)
j: $TiO_2$ (mean grain size 0.3 $\mu$m)
k: $SiO_2$ (mean grain size 0.1 $\mu$m)
l: $BaSO_4$ (mean grain size 0.2 $\mu$m)

EXAMPLE 2-1

| | |
|---|---|
| White Electrically Conductive Powder (as shown in Table 4) | 50 parts |
| White Inorganic Powder (as shown in Table 4) | 50 parts |
| Vinyl Chloride-Vinyl Acetate Copolymer (composition 87:13; degree of polymerization 430) | 35 parts |
| Polyester Polyurethane (molecular weight 150,000) | 10 parts |
| Polyisocyanate (commercial name: Desmodur L; solid content of 75% solution) | 5 parts |
| Methyl Ethyl Ketone | 2700 parts |

The above described components were well mixed to prepare coating compositions for leader tapes and pro-

EXAMPLE 2-2

Sb-doped $SnO_2$ (Powder d) was used as an electrically conductive powder and $\alpha$-$Al_2O_3$ (Powder i) was used as a white inorganic powder, the mixing ratio being changed as shown in Table 5. Other procedures were carried out in an analogous manner to Example 2-1 to obtain leader tapes.

The results are shown as Sample Nos. 40 to 48 in Table 5.

It is apparent from Table 5 that the use of only the white inorganic powder results in unfavourable electrification property, but joint use of the white inorganic powder with the electrically conductive powder results in improvement of the durability of the cleaning effect.

COMPARATIVE EXAMPLE 2-1

The leader tape, Sample No. 40 of Example 2-2 was subjected to an antistatic treatment by coating the surface thereof with an antistatic agent of quaternary ammonium salt type (commercial name: EFUKOORU 72 manufactured by Matsumoto Yushi KK) in a proportion of 200 mg/$m^2$. The properties of the resulting leader tape are shown Sample No. 49 in Table 5.

TABLE 5

| Sample No. | Sb—doped $SnO_2$ Powder d (parts) | $\alpha$-$Al_2O_3$ Powder i (parts) | Percent Phototrans- mission (%) | Cramp Force (g) | Cleaning Effect (times) | Electri- fication Property (cm) | After Running 10,000 Times ||||
|---|---|---|---|---|---|---|---|---|---|---|
| | | | | | | | Head Clogging | Missing of Coating Layer | Cleaning Effect (times) | Electri- fication Property (cm) |
| Example 2-2 | | | | | | | | | | |
| 40 | 0 | 100 | 74 | 1800 or more | 1 | 10.0 | no | no | 1 | 10.0 |
| 41 | 10 | 90 | 75 | 1800 or | 1 | 2.0 | " | " | 1 | 2.0 |

TABLE 5-continued

| Sample No. | Sb—doped SnO₂ Powder d (parts) | α-Al₂O₃ Powder i (parts) | Percent Phototrans- mission (%) | Cramp Force (g) | Cleaning Effect (times) | Electri- fication Property (cm) | After Running 10,000 Times ||||
|---|---|---|---|---|---|---|---|---|---|---|
| | | | | | | | Head Clogging | Missing of Coating Layer | Cleaning Effect (times) | Electri- fication Property (cm) |
| 42 | 20 | 80 | 76 | 1800 or more | 1 | 0.5 | " | " | 1 | 0.5 |
| 43 | 30 | 70 | 76 | 1800 or more | 1 | 0.5 | " | " | 1 | 0.5 |
| 44 | 50 | 50 | 78 | 1800 or more | 1 | 0 | " | " | 1 | 0 |
| 45 | 70 | 30 | 80 | 1800 or more | 1 | 0 | " | " | 1 | 0 |
| 46 | 80 | 20 | 81 | 1800 or more | 1 | 0 | " | " | 1 | 0 |
| 47 | 90 | 10 | 83 | 1800 or more | 2 | 0 | " | " | 2 | 0 |
| 48 | 100 | 0 | 84 | 1800 or more | 2 | 0 | " | " | 3 | 0 |
| Comparison 2-1 | | | | | | | | | | |
| 49 | 0 | 100 | 74 | 1800 or more | 1 | 1 | yes | | 2 | 5.0 |

EXAMPLE 2-3

Using 50 parts of White Electrically Conductive Powder a and 50 parts of White Inorganic Powder i, the procedure of Example 2-1 was repeated except changing the total weight parts of Vinyl Chloride-Vinyl Acetate Copolymer, Polyester Polyurethane and Polyisocyanate and the weight part of the solvent without changing the relative proportion of the binder (70:20:10)

The results are shown as Sample Nos. 50 to 58 in Table 6.

It will clearly be understood from Table 6 that the amount of the binder is preferably about 15 to 600% by weight.

EXAMPLE 2-4

The leader tapes of Example 2-1, Example 2-2 and Compatative Example 2-1 were slit in a width of ½ inch to obtain leader tapes for video tapes. The resulting leader tapes were combined with hubs in the order of 17 cm of Leader Tape, 247 m of Video Tape and 17 cm of Leader Tape. The resulting VHS video cassette tapes were respectively subjected to running 200 times in a VHS video deck for assessment of the performances.

The results are shown as Sample Nos. 59 to 63 (Example 2-4) and as Sample Nos. 64 and 65 (Comparison 2-2).

It is apparent from Table 7 that the leader tapes of the present invention are free from head clogging and increase of drop out as leader tapes for video tapes.

TABLE 6

| Sample No. | Total Amount of Binder (parts) | Percent Phototrans- mission (%) | Cramp Force (g) | Cleaning Effect (times) | Electri- fication Property (cm) | After Running 10,000 Times ||||
|---|---|---|---|---|---|---|---|---|---|
| | | | | | | Head Clogging | Missing of Coating Layer | Cleaning Effect (times) | Electri- fication Property (cm) |
| Example 2-3 | | | | | | | | | |
| 50 | 10 | 70 | 1500 | 1 | 0 | no | yes | 1 | 0 |
| 51 | 15 | 72 | 1550 | 1 | 0 | " | somewhat | 1 | 0 |
| 52 | 25 | 74 | 1600 | 1 | 0 | " | no | 1 | 0 |
| 53 | 50 | 76 | 1800 or more | 1 | 0 | " | " | 1 | 0 |
| 54 | 100 | 78 | 1800 or more | 1 | 0 | " | " | 1 | 0 |
| 55 | 200 | 79 | 1800 or more | 1 | 0 | " | " | 1 | 0 |
| 56 | 400 | 80 | 1800 or more | 1 | 0 | " | " | 1 | 0 |
| 57 | 600 | 80 | 1800 or more | 2 | 0.5 | " | " | 2 | 0.5 |
| 58 | 800 | 81 | 1800 or more | 2 | 1.0 | " | " | 3 | 1.0 |

TABLE 7

| Sample No. | Electrically Conductive Powder | Amount of Electrically Conductive Powder (parts) | White Inorganic Powder | Amount of white Inorganic Powder (parts) | Coating of Antistatic Agent | Head Clogging | Increase of Drop Out |
|---|---|---|---|---|---|---|---|
| Example 2-4 | | | | | | | |
| 59 | a | 50 | i | 50 | no | no | no |
| 60 | b | 50 | i | 50 | " | " | " |
| 61 | c | 50 | i | 50 | " | " | " |

TABLE 7-continued

| Sample No. | Electrically Conductive Powder | Amount of Electrically Conductive Powder (parts) | White Inorganic Powder | Amount of white Inorganic Powder (parts) | Coating of Antistatic Agent | Head Clogging | Increase of Drop Out |
|---|---|---|---|---|---|---|---|
| 62 | d | 50 | i | 50 | " | " | " |
| 63 | e | 50 | i | 50 | " | " | " |
| Comparison 2-2 | | | | | | | |
| 64 | — | — | i | 100 | " | " | yes |
| 65 | — | — | i | 100 | yes | yes | somewhat |

Examples of the white resin powder used in the following Examples and Comparative Examples are as follows:

m: Polyethylene Powder (mean grain size 2.5 μm; MP 110° C.; true specific gravity 0.95)

h: Triazine type Resin Powder (mean grain size 2.5 μm).

It is apparent from the results of Table 8 that the leader tapes using the electronconductive powders and white resin powders in combination according to the present invention are more excellent in cleaning effect as well as antistatic effect and these effects are not changed even after running 10,000 times.

TABLE 8

| Sample No. | White Electrically Conductive Powder | White Resin Powder | Percent Phototransmission (%) | Cramp Force (g) | Cleaning Effect (times) | Electrification Property (cm) | After Runing 10,000 Times | | | |
|---|---|---|---|---|---|---|---|---|---|---|
| | | | | | | | Head Clogging | Missing of Coating Layer | Cleaning Effect (times) | Electrification Property (cm) |
| Example 3-1 | | | | | | | | | | |
| 66 | a | m | 83 | 1600 or more | 1 | 0 | no | no | 2 | 0 |
| 67 | b | m | 82 | 1600 or more | 1 | 0 | " | " | 2 | 0 |
| 68 | c | m | 82 | 1600 or more | 1 | 0 | " | " | 2 | 0 |
| 69 | d | m | 83 | 1600 or more | 1 | 0 | " | " | 2 | 0 |
| 70 | e | m | 84 | 1600 or more | 1 | 0 | " | " | 2 | 0 |
| 71 | a | h | 82 | 1800 or more | 1 | 0 | " | " | 2 | 0 |
| 72 | b | h | 81 | 1800 or more | 1 | 0 | " | " | 2 | 0 |
| 73 | c | h | 82 | 1800 or more | 1 | 0 | " | " | 2 | 0 |
| 74 | d | h | 83 | 1800 or more | 1 | 0 | " | " | 2 | 0 |
| 75 | e | h | 84 | 1800 or more | 1 | 0 | " | " | 2 | 0 |

EXAMPLE 3-1

| | |
|---|---|
| Electrically Conductive Powder (as shown in Table 8) | 50 parts |
| White Resin Powder (as shown in Table 8) | 50 parts |
| Vinyl Chloride-Vinyl Acetate Copolymer (composition: 87:13, degree of Polymerization) | 70 parts |
| Polyester Polyurethane (molecular weight: 150,000) | 20 parts |
| Polyisocyanate (commercial name: Desmodur L; solid content of 75% solution) | 10 parts |
| Methyl Ethyl Ketone | 2700 parts |

The above described components were well blended to prepare coating compositions for leader tapes and then processed in an analogous manner to Example 1-1 to obtain leader tapes for compact cassettes.

The thus resulting leader tapes were subjected to assessment in an analogous manner to Example 1-1, thus obtaining results as shown in Table 8 as Sample Nos. 66 to 75.

EXAMPLE 3-2

Sb-doped $SnO_2$ (Powder d) was used as an electrically conductive powder and Triazine type Resin Powder (Powder h) was used as a white resin powder, the mixing ratio being changed as shown in Table 9. Other procedures were carried out in an analogous manner to Example 3-1 to obtain leader tapes.

The results are shown as Sample Nos. 76 to 84 in Table 9.

It is apparent from Table 9 that the use of only the white resin powder results in unfavourable electrification property.

COMPARATIVE EXAMPLE 3-1

The leader tape, Sample No. 77 of Example 3-2 was subjected to an antistatic treatment by coating the surface thereof with an antistatic agent of quaternary ammonium salt type (commercial name: EFUKOORU 72 manufactured by Matsumoto Yushi KK) is a proportion of 200 mg/m².

TABLE 9

| Sample No. | Sb—doped SnO$_2$ Powder d (parts) | Triazine type Resin Powder h (parts) | Percent Phototransmission (%) | Cramp Force (g) | Cleaning Effect (times) | Electrification Property (cm) | After Running 10,000 Times ||||
|---|---|---|---|---|---|---|---|---|---|---|
| | | | | | | | Head Clogging | Head Scratch | Missing of Coating Layer | Cleaning Effect (times) | Electrification Property (cm) |

| Sample No. | Sb—doped SnO$_2$ Powder d (parts) | Triazine type Resin Powder h (parts) | Percent Phototransmission (%) | Cramp Force (g) | Cleaning Effect (times) | Electrification Property (cm) | Head Clogging | Head Scratch | Missing of Coating Layer | Cleaning Effect (times) | Electrification Property (cm) |
|---|---|---|---|---|---|---|---|---|---|---|---|
| Example 3-2 | | | | | | | | | | | |
| 76 | 0 | 100 | 84 | 1800 or more | 1 | 10.0 | no | no | no | 2 | 10.0 |
| 77 | 10 | 90 | 84 | 1800 or more | 1 | 2.0 | " | " | " | 2 | 2.0 |
| 78 | 20 | 80 | 83 | 1800 or more | 1 | 0.5 | " | " | " | 2 | 0.5 |
| 79 | 30 | 70 | 83 | 1800 or more | 1 | 0.5 | " | " | " | 2 | 0.5 |
| 80 | 50 | 50 | 83 | 1800 or more | 1 | 0 | " | " | " | 2 | 0 |
| 81 | 70 | 30 | 83 | 1800 or more | 1 | 0 | " | " | " | 2 | 0 |
| 82 | 80 | 20 | 83 | 1800 or more | 1 | 0 | " | " | " | 2 | 0 |
| 83 | 90 | 10 | 83 | 1800 or more | 2 | 0 | " | " | " | 3 | 0 |
| 84 | 100 | 0 | 84 | 1800 or more | 2 | 0 | " | somewhat | " | 4 | 0 |
| Comparison 3-1 | | | | | | | | | | | |
| 85 | 0 | 100 | 84 | 1800 or more | 1 | 1.0 | " | somewhat | " | 1 | 5.0 |

EXAMPLE 3-3

Using 50 parts of Electrically Conductive Powder d and 50 parts of White Resin Powder h, the procedure of Example 3-1 was repeated except changing the total weight parts of Vinyl Chloride-Vinyl Acetate Copolymer, Polyester Polyurethane and Polyisocyanate, as the binder, and the weight part of the solvent without changing the relative proportion of this binder (70:20:10), thus obtaining leader tapes.

The results are shown as Sample Nos. 86 to 94, in Table 10.

It will clearly be understood from Table 10 that the amount of the binder is preferably about 15 to 600% by weight.

EXAMPLE 3-4

The leader tapes of Example 3-1, Example 3-2 and Comparative Example 3-1 were slit in a width of ½ inch to obtain cleaning leader tapes for video tapes. The resulting leader tapes were combined with hubs in the order of 17 cm of Cleaning Leader Tape, 247 m of Video Tape and 17 cm of Cleaning Leader Tape. The resulting VHS video cassette tapes were respectively subjected to running 200 times in a VHS video deck for assessment of the performances. The results are shown as Sample Nos. 95 to 101 in Table 11.

It is apparent from Table 11 that the cleaning leader tapes of the present invention are free from head clogging and increase of drop out as leader tapes for video.

TABLE 10

| Sample No. | Total Amount of Binder (parts) | Percent Phototransmission (%) | Cramp Force (g) | Cleaning Effect (times) | Electrification Property (cm) | After Running 10,000 Times ||||
|---|---|---|---|---|---|---|---|---|---|
| | | | | | | Head Clogging | Missing of Coating Layer | Cleaning Effect (times) | Electrification Property (cm) |
| 86 | 10 | 71 | 1500 | 1 | 0 | no | yes | 2 | 0.5 |
| 87 | 15 | 76 | 1560 | 1 | 0 | " | somewhat | 2 | 0.5 |
| 88 | 25 | 79 | 1600 | 1 | 0 | " | no | 2 | 0 |
| 89 | 50 | 81 | 1800 or more | 1 | 0 | " | " | 2 | 0 |
| 90 | 100 | 82 | 1800 or more | 1 | 0 | " | " | 2 | 0 |
| 91 | 200 | 83 | 1800 or more | 1 | 0 | " | " | 2 | 0 |
| 92 | 400 | 83 | 1800 or more | 1 | 0 | " | " | 2 | 0 |
| 93 | 600 | 84 | 1800 or more | 2 | 0.5 | " | " | 3 | 0.5 |
| 94 | 800 | 85 | 1800 or more | 2 | 1.0 | " | " | 4 | 1.0 |

TABLE 11

| Sample No. | Electrically Conductive Powder | Amount of Electrically Conductive Powder (parts) | White Resin Powder | Amount of White Resin (parts) | Coating of Antistatic Agent | Head Clogging | Increase of Drop Out |
|---|---|---|---|---|---|---|---|
| 95 | a | 50 | h | 50 | no | no | no |

TABLE 11-continued

| Sample No. | Electrically Conductive Powder | Amount of Electrically Conductive Powder (parts) | White Resin Powder | Amount of White Resin (parts) | Coating of Antistatic Agent | Head Clogging | Increase of Drop Out |
|---|---|---|---|---|---|---|---|
| 96 | b | 50 | h | 50 | " | " | " |
| 97 | c | 50 | h | 50 | " | " | " |
| 98 | d | 50 | h | 50 | " | " | " |
| 99 | e | 50 | h | 50 | " | " | " |
| 100 | — | — | h | 100 | " | " | yes |
| 101 | — | — | h | 100 | yes | yes | somewhat |

EXAMPLE 4

The procedure of Example 2-3, Sample No. 54 was repeated but using 50 parts of Sb-doped $SnO_2$ (Powder d) as an electrically conductive powder, 25 parts of $\alpha$-$Al_2O_3$ (Powder i) as a white inorganic powder and 25 parts of Triazine type Resin Powder (Powder h) as a white resin powder, thus obtaining a leader tape having substantially the same properties except a percent photo-transmission of 77, as those of Sample No. 54 of Example 2-3.

When the surface state of a head used in the test was observed after running 10,000 times by means of a microscope, however, some scratch was found in the running direction on the head surface in the case of Sample No. 54, while no scratch was found in the case of this Example 4.

It will be understood from this result that the leader tape having a coating layer using jointly an electrically conductive powder, white inorganic powder and white resin powder scratches a head less than the tape containing no white resin powder.

As is evident from the foregoing illustrations and Examples, a magnetic tape having the leader tape whose cleaning layer contains predominantly an electrically conductive powder and binder according to the present invention is more excellent in cleaning effect as well as antistatic effect, which effects are hardly deteriorated even after running 10,000 times, and is more improved in effects of preventing head clogging and increase of drop out, as compared with magnetic tapes of the prior art.

Moreover, a magnetic tape having the leader tape whose cleaning layer contains further a white inorganic powder in addition to the above described powders according to the present invention exhibits a more improved cleaning effect.

In a magnetic tape having the cleaning leader tape whose coating layer contains predominantly an electrically conductive powder, white resin powder and binder according to the present invention, not only the cleaning effect can further be improved more than in the case of using the white electrically conductive powder, but there is given an advantage that a head is hardly scratched because of the white resin powder.

What is claimed is:

1. A magnetic tape having a leader tape comprising a coating layer provided on one or both sides of a support at least one end of said magnetic tape, characterized in that the coating layer contains, as predominant components, an electrically conductive powder having a mean grain size of 0.001 to 1 um and a volume resistance of $10^0$ to $10^8$ $\Omega$-cm and being at least one member selected from the group consisting of $SnO_2$, $In_2O_3$, ZnO, $BaTiO_3$, and $SrTiO_3$ which have been modified to provide electrical conductivity and a binder and the leader tape has a percent photo-transmission of at least 20%.

2. The magnetic tape having a leader tape as claimed in claim 1, wherein the electrically conductive powder is at least one member selected from the group consisting of $SnO_2$, $In_2O_3$, $BaTiO_3$, $SrTiO_3$ and (Ba, Sr) $TiO_3$ which are doped with an element of different valence to increase the conductivity.

3. The magnetic tape having a leader tape as claimed in claim 1, wherein the electrically conductive powder powder is at least one member selected from the group consisting of ZnO, $BaTiO_3$ and $SrTiO_3$ into which oxygen defects are introduced.

4. The magnetic tape having a leader tape as claimed in claim 1, wherein the electrically conductive powder is at least one member of white pigments and extenders which are coated with at least one member of electrically conductive materials.

5. The magnetic tape having a leader tape as claimed in claim 4, wherein the electrically conductive materials are $SnO_2$, $In_2O_3$, ZnO, $BaTiO_3$ and $SrTiO_3$ which have electrical conductivity, $SnO_2$, $In_2O_3$, $BaTiO_3$, $SrTiO_3$ and (Ba, Sr)$TiO_3$ which are doped with an element of different valence, and ZnO, $BaTiO_3$ and $SrTiO_3$ into which oxygen defects are introduced.

6. The magnetic tape having a leader tape as claimed in claim 1, wherein the binder is in a proportion of 15 l to 600 parts by weight to 100 parts by weight of the powders.

7. The magnetic tape having a leader tape as claimed in claim 1, wherein the support is a non-magnetic flexible support having a haze of at most 80%.

8. The magnetic tape having a leader tape as claimed in claim 1, wherein the binder is at least one member selected from the group consisting of vinyl chloride-vinyl acetate copolymers, vinylidene chloride copolymers, nitrocellulose, polyester resins, polyurethane resins and polyisocyanates.

9. The magnetic tape having a leader tape as claimed in claim 1, wherein the coating layer has a thickness of 0.05 to 20 um.

10. A magnetic tape having a leader tape comprising a coating layer provided on one or both sides of a support, at least one end of the tape, characterized in that the coating layer contains, as predominant components, an electrically conductive powder having a mean grain size of 0.001 to 1 um and a volume resistance of $10^0$ to $10^8$ $\Omega$-cm and being at least one member selected from the group consisting of $SnO_2$, $In_2O_3$, ZnO, $BaTiO_3$, and $SrTiO_3$ which have electrically conductivity, a white inorganic powder having a particle size range of 0.01 to 5 um and a binder and the leader tape has a percent photo-transmission of at least 20%.

11. The magnetic tape having a leader tape as claimed in claim 10, wherein the white inorganic powder has a grain size of 0.01 to 3 $\mu$m.

12. The magnetic tape having a leader tape as claimed in claim 10, wherein the white inorganic powder is at least one member selected from the group consisting of alumina, titanium oxide, zinc sulfide, lithopone, barium sulfate, zinc oxide, aluminum silicate and silicon oxide.

13. The magnetic tape having a leader tape as claimed in claim 10, wherein the white inorganic powder is used in a proportion of up to 950 parts by weight to 100 parts by weight of the electrically conductive powder.

14. A magnetic tape having a leader tape comprising a coating layer provided on one or both sides of a support, at least one end of the tape, characterized in that the coating layer contains, as predominant components, an electrically conductive powder having a mean grain size of 0.001 to 1 um and a volume resistance of $10^0$ to $10^8$ Ω-cm and being at least one member selected from the group consisting of $SnO_2$, $In_2O_3$, $ZnO$, $BaTiO_3$, and $SrTiO_3$ which have electrically conductivity, a white resin powder having a particle size in the range of 0.1 to 10 um and a binder and the leader tape has a percent photo-transmission of at least 20%.

15. The magnetic tape having a leader tape as claimed in claim 14, wherein the white resin powder has a grain size of 0.1 to 3 μm.

16. The magnetic tape having a leader tape as claimed in claim 14, wherein the white resin powder is at least one member selected from the group consisting of acetylcellulose, polyethylene, polypropylene, polyester resin, polyamide resin, polyacrylonitrile resin, polyacetyl resin, phenol resin, urea resin, triazine resin, malamine resin and epoxy resin powders.

17. The magnetic tape having a leader tape as claimed in claim 14, wherein the white resin powder is used in a proportion of up to 450 parts by weight to 100 parts by weight of the electrically conductive powder.

18. A magnetic tape having a leader tape comprising a coating layer provided on one or both sides of a support at at least one end of said magnetic tape, characterized in that the coating layer contains, as predominant components, at least one electrically modified conductive powder selected from the group consisting of $SnO_2$, $InO_3$, $ZnO$, $BatiO_3$ and $SrTiO_3$, a white inorganic powder, a white resin powder and a binder and the leader tape has a percent photo-transmission of at least 20%.

* * * * *